United States Patent
Li et al.

(10) Patent No.: US 10,176,437 B2
(45) Date of Patent: Jan. 8, 2019

(54) METHOD AND APPARATUS TO ANALYTICALLY SUPPORT PARTS PROVISION FOR HARDWARE MAINTENANCE SERVICE

(71) Applicant: International Business Machines Corporation, Armonk, NY (US)

(72) Inventors: Chang Sheng Li, Beijing (CN); Qi Cheng Li, Beijing (CN); Shao Chun Li, Beijing (CN); Soumitra Sarkar, Cary, NC (US); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 15/142,457

(22) Filed: Apr. 29, 2016

(65) Prior Publication Data
US 2017/0316339 A1    Nov. 2, 2017

(51) Int. Cl.
*G06N 99/00*    (2010.01)
*G06N 5/02*    (2006.01)

(52) U.S. Cl.
CPC ........... *G06N 99/005* (2013.01); *G06N 5/022* (2013.01)

(58) Field of Classification Search
CPC ........... G06Q 10/06315; G06Q 10/087; G06Q 30/0202; G06Q 10/04
See application file for complete search history.

(56) References Cited

U.S. PATENT DOCUMENTS

| | | | | |
|---|---|---|---|---|
| 6,205,431 | B1* | 3/2001 | Willemain | G06Q 10/04 705/28 |
| 8,200,521 | B2* | 6/2012 | Hader | G06Q 10/06 705/7.25 |
| 8,862,534 | B1* | 10/2014 | Faratin | G06F 17/30616 706/45 |
| 9,015,059 | B2 | 4/2015 | Sims, III et al. | |
| 2002/0062245 | A1* | 5/2002 | Niu | G06Q 30/02 705/14.51 |
| 2003/0050824 | A1 | 3/2003 | Suermondt et al. | |
| 2005/0273376 | A1* | 12/2005 | Ouimet | G06Q 10/04 705/7.31 |

(Continued)

OTHER PUBLICATIONS

Invensys Customer First, Program Guide, 2010, printed Apr. 13, 2016, pp. 1-6.

*Primary Examiner* — Jaehwan Oh
(74) *Attorney, Agent, or Firm* — Scully, Scott, Murphy & Presser, P.C.; Vazken A. Alexanian

(57) ABSTRACT

The methods, systems, and computer program products described herein provide optimized provisioning of replacement parts for service calls through the use of machine learning. In some aspects, historical hardware maintenance tickets may be processed to generate symptoms vectors identifying sets of symptoms associated with the hardware maintenance tickets. The symptoms vectors and corresponding parts usage records of the historical hardware maintenance tickets may be used train a decision model to predict a probability that a particular part will be used to fulfill the new hardware maintenance ticket. The predicted probability may be used by the system when generating a parts provisioning plan for the new hardware maintenance ticket.

20 Claims, 10 Drawing Sheets

(56) References Cited

U.S. PATENT DOCUMENTS

| | | | |
|---|---|---|---|
| 2005/0273415 A1* | 12/2005 | Mathews | G06Q 10/06 705/35 |
| 2008/0059120 A1 | 3/2008 | Xiao et al. | |
| 2011/0289363 A1 | 11/2011 | Gadher | |
| 2014/0019530 A1 | 1/2014 | Dal Bello et al. | |
| 2015/0161545 A1* | 6/2015 | Willemain | G06Q 10/06315 705/7.25 |
| 2015/0220875 A1 | 8/2015 | Tamaki et al. | |
| 2016/0352760 A1* | 12/2016 | Mrkos | H04L 63/1416 |

\* cited by examiner

| Ticket ID | Part ID | provisioned | | Not provisioned | |
|---|---|---|---|---|---|
| | | Used | Not used | Used | Not used |
| T234889 | P9ddu | 1 | 0 | 0 | 0 |
| | Pdi344 | 0 | 1 | 0 | 0 |
| | P2ddd | 1 | 0 | 0 | 0 |
| ... | ... | 0 | 0 | 1 | 0 |
| T389048 | P1344 | 0 | 0 | 0 | 1 |
| | P8d3e | 1 | 0 | 0 | 0 |
| | Pdyr8 | 0 | 1 | 0 | 0 |
| | P0484 | | | | |
| ... | ... | | | | |

Fig. 4

Ticket "A17ZHR0":
MC NOT POWERING ON. NO FAN. SOME LED ACTIVITY. TRIED WITH REBOOT Parts Provision Plan for "A17ZHR0":

| Parts ID | Probability | Over-provision Cost ($) | Under-provision Cost ($) | |
|---|---|---|---|---|
| P9ddu | 0.8 | 55 | 100 | remove |
| Pdi344 | 0.75 | 24 | 77 | remove |
| P2ddd | 0.36 | 18 | 60 | remove |
| P1344 | 0.57 | 66 | 55 | add |
| ... | | | | |

Estimated over-provision cost($): 255
Estimated under-provision cost($): 198

Risk Tolerance: 0% ←———■———→ 100%

Fig. 9

METHOD AND APPARATUS TO ANALYTICALLY SUPPORT PARTS PROVISION FOR HARDWARE MAINTENANCE SERVICE

FIELD

The present application relates generally to parts provisioning, and more particularly to the use of machine learning to optimize parts provisioning for service calls.

BACKGROUND

End users of hardware systems often maintain service contracts with hardware maintenance service providers to perform repairs and maintenance on the hardware systems. When an end user logs a service call for a particular piece of hardware, a service engineer is often sent to the site of the end user to perform repair or maintenance work on the hardware. The service engineer is typically sent with a number of replacement parts for the particular piece of hardware in question based on a remote service agent's experience and the symptoms reported by the end user.

BRIEF SUMMARY

The methods, systems, and computer program products described herein provide optimized provisioning of replacement parts for service calls through the use of machine learning. In some aspects, historical hardware maintenance tickets may be processed to generate symptoms vectors identifying sets of symptoms associated with the hardware maintenance tickets. The symptoms vectors and corresponding parts usage records of the historical hardware maintenance tickets may be used train a decision model to predict a probability that a particular part will be used to fulfill the new hardware maintenance ticket. The predicted probability may be used by the system when generating a parts provisioning plan for the new hardware maintenance ticket.

In an aspect of the present disclosure, a method is disclosed including receiving a historical maintenance ticket associated with a type of hardware device, processing the historical maintenance ticket to identify one or more symptoms of the historical maintenance ticket, constructing a symptoms vector for the historical maintenance ticket based at least in part on the identified one or more symptoms of the historical maintenance ticket, receiving parts usage and provisioning records associated with the type of hardware device, determining based at least in part on the parts usage and provisioning records whether a part associated with the type of hardware device was provisioned or not provisioned for the historical maintenance ticket, determining based at least in part on the parts usage and provisioning records whether the part was used or not used for the historical maintenance ticket and training a decision model based at least in part on the symptoms vector for the historical maintenance ticket, the determination of whether the part was provisioned or not provisioned for the historical maintenance ticket, and the determination of whether the part was used or not used for the historical maintenance ticket. The training configures the decision model to determine a probability that the part will be used by a new maintenance ticket associated with the type of hardware device. The method further includes receiving a new maintenance ticket associated with the type of hardware device, processing the new maintenance ticket to identify one or more symptoms of the new maintenance ticket, constructing a symptoms vector for the new maintenance ticket based at least in part on the identified one or more symptoms of the new maintenance ticket, executing the trained decision model using the symptoms vector of the new maintenance ticket to determine a probability that the part will be used by the new maintenance ticket, and generating a parts provisioning plan based at least in part on the determined probability that the part will be used by the new maintenance ticket.

In aspects of the present disclosure apparatus, systems, and computer program products in accordance with the above aspect may also be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4 illustrates an example of parts and usage records for parts associated with a maintenance ticket in accordance with an embodiment of the present disclosure.

FIG. 9 illustrates a user interface including a parts provisioning plan in accordance with an embodiment of the present disclosure.

DETAILED DESCRIPTION

The methods, systems, and computer program products of the present disclosure may provide ways to optimize the provisioning of replacement parts for service calls.

Figure 1:
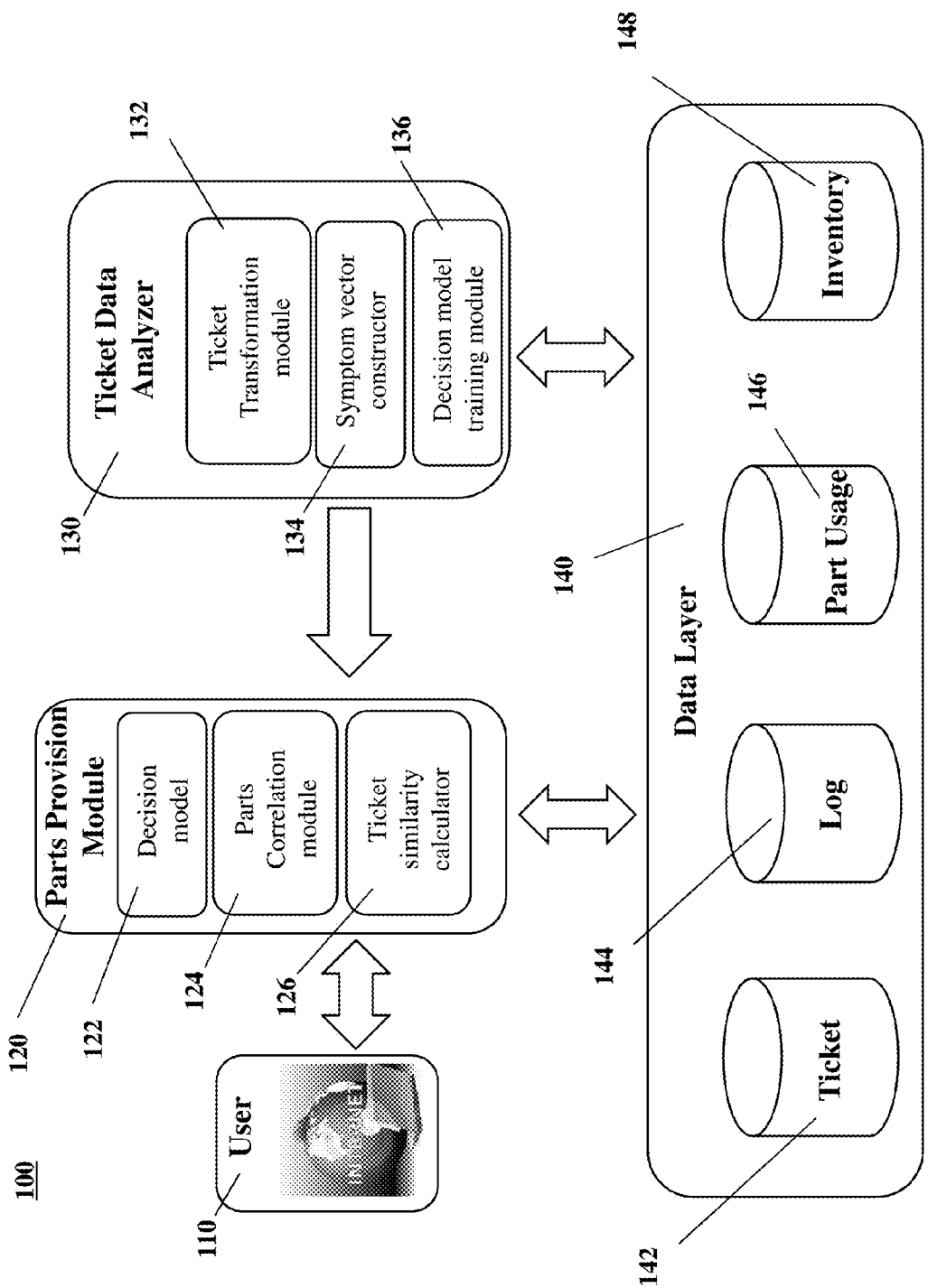
FIG. 1 is a system diagram of a provisioning system in accordance with an embodiment of the present disclosure.

With reference to FIG. 1, a provisioning system 100 includes a user interface 110, a parts provision module 120, a ticket data analyzer 130, e.g., running on one or more hardware processors and operatively coupled to one another, and a data layer 140 implemented on one or more storage systems.

User interface 110 may provide a user, e.g., a service agent or engineer, with access to provisioning system 100, for example, via a wired or wireless network, the internet, or other similar communications systems.

Parts provision module 120 may include a decision model 122 that is configured to generate a provision plan for provisioning a service engineer for a service call, a parts correlation module 124 that is configured to determine a correlation between parts, and a ticket similarity calculator 126 that is configured to determine a similarity between tickets. Decision model 122 may generate the provision plan based on inputs received from ticket data analyzer 130 and data layer 140.

Ticket data analyzer 130 includes a ticket transformation module 132, a symptom vector constructor 134 and a decision model training module 136. Ticket transformation module 136 is configured to convert maintenance tickets and log files received from data layer 140 into a form usable by symptom vector constructor 134. Symptom vector constructor 134 is configured to construct symptoms vectors based on the converted maintenance tickets and log files. Decision model training module 134 is configured to utilize the output symptoms vectors from symptom vector constructor 134 to train decision model 122.

Data Layer 140 includes memory storing tickets 142, log files 144, part usage records 146, and part inventory levels 148.

Figure 2:
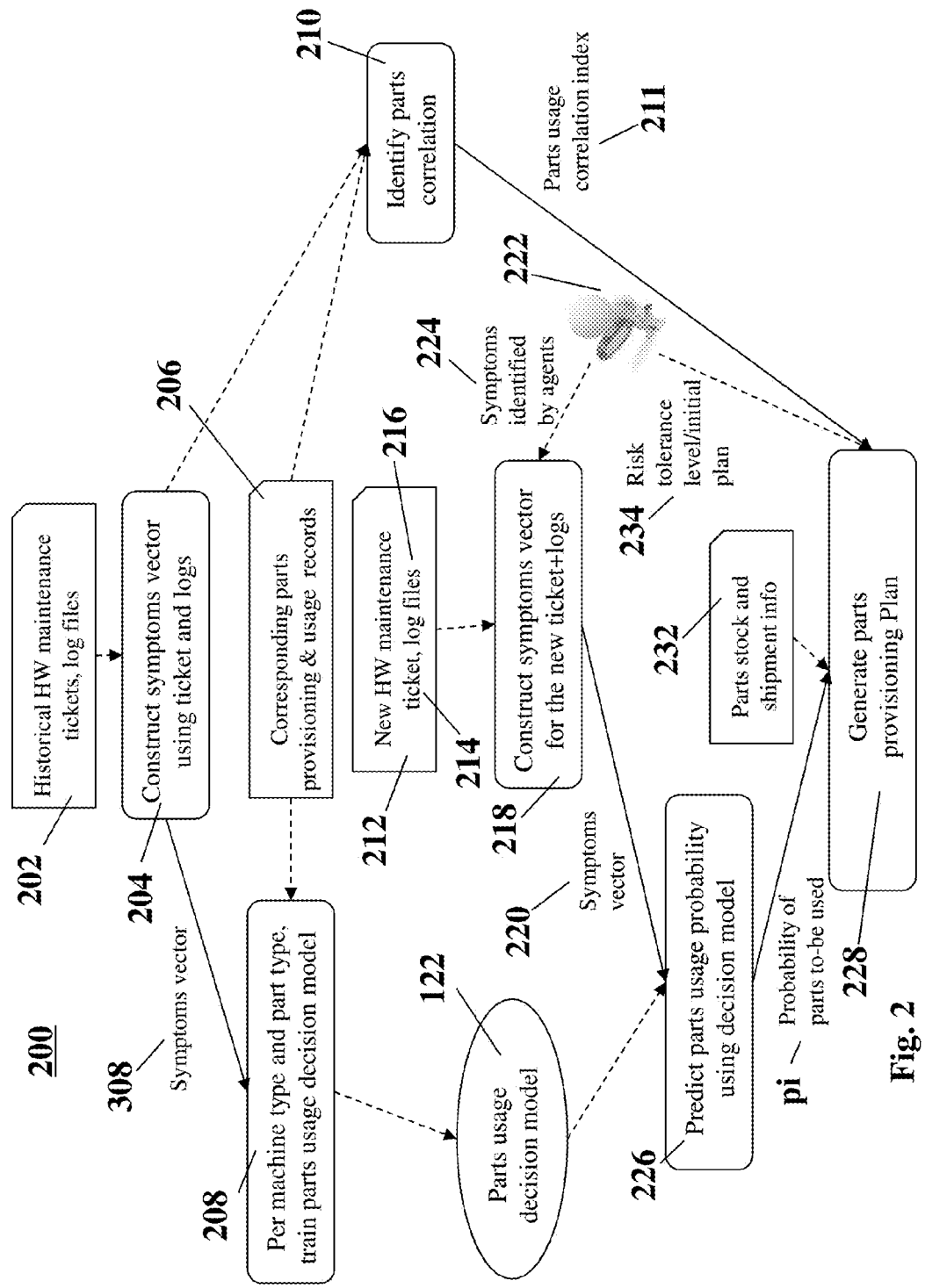
FIG. 2 is a flow chart illustrating a method of generating a parts provision plan in accordance with an embodiment of the present disclosure.
Figure 3:
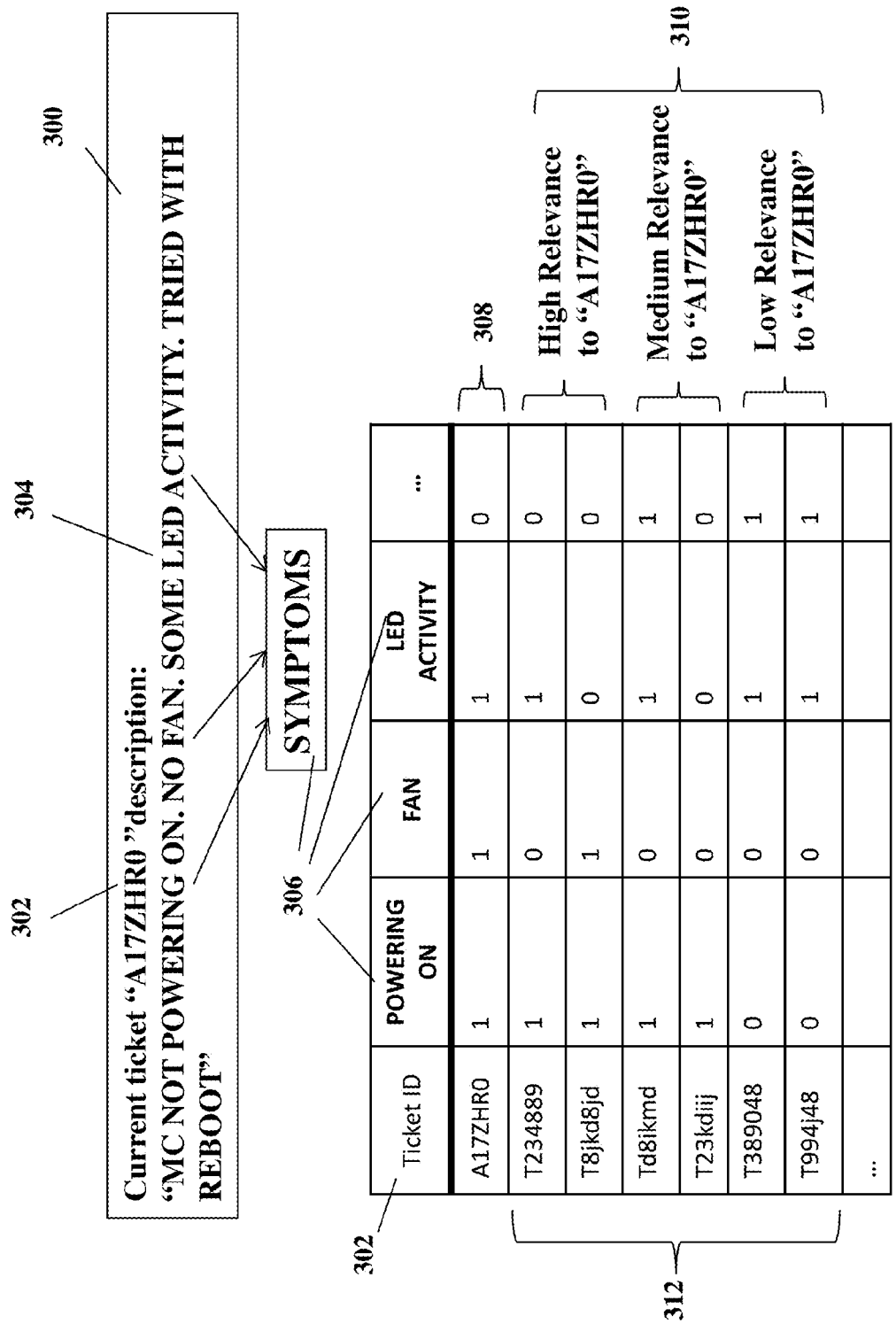
FIG. 3 illustrates an example maintenance ticket, symptoms generated from the maintenance ticket, and symptoms vectors generated from a number of maintenance tickets in an accordance with an embodiment of the present disclosure.

With reference now to FIG. 2, a method 200 that may be employed by provisioning system 100 is illustrated. At 202, ticket data analyzer 130 receives historical data about hardware maintenance tickets 142 and log files 144 from data layer 140. As illustrated in FIG. 3, each ticket 300 may include, for example, a ticket identifier 302, and a ticket description 304. Ticket transformation module 132 mines each ticket for symptoms 306 and provides the symptoms 306 to symptom vector constructor 134 for construction of a symptoms vector 308. For example, ticket transformation module 132 may parse the ticket description 304 for specific terms related to different symptoms. In the example provided by FIG. 3, ticket transformation module 132 parses out the terms "powering on", "fan", and "led activity" from description 304 of ticket "A17ZHR0" as symptoms 306.

A symptom 306 may be any term provided by a customer in a hardware maintenance ticket 142. In some embodiments, provisioning system 100 may store a list of symptoms terms that are associated with a particular part or hardware device in data layer 140 for later use by ticket transformation module 132 when mining tickets for symptoms 306. For example, an initial list of symptoms terms may be initially generated by provisioning system 100 based on an analysis of historical hardware maintenance tickets 142. The analysis may be performed by human agents, service engineers, by text analysis software, or in any other similar manner. The analysis may determine terms that are common to one or more hardware maintenance tickets and identify those terms as potential symptoms 306. Ticket transformation module 132 may then utilize the identified terms when mining new or historical tickets for symptoms. In some embodiments, additional symptoms terms may also be determined and added to the list of symptoms terms stored in data layer 140 as new hardware maintenance tickets are reviewed.

At 204, symptom vector constructor 134 receives symptoms 306 as inputs from ticket transformation module 132 and generates a symptoms vector 308 for ticket "A17ZHR0". In some embodiments, symptoms vector 308 includes a string of binary values each corresponding to a potential symptom 306 of the particular piece of hardware that is the subject of the ticket. In some embodiments, the symptoms vector 308 may correspond to potential symptoms of any hardware serviced by a hardware maintenance service provider. As shown in FIG. 3, an example symptoms vector 308 for a ticket "A17ZHR0" includes a value of "1" for each of the symptoms identified by ticket transformation module 132, i.e., "powering on", "fan", and "led activity". Symptoms vector 308 for ticket "A17ZHR0" also includes a value of "0" for any symptoms not found in the ticket description 304. Although described with reference to binary values, symptoms vector 308 may include any other similar methods of indicating whether a symptom has been identified from a ticket. Symptoms vector 308 may be sent to decision model training module 136 for use in training parts usage decision model 122.

At 206, historical parts provisioning and usage records 400 are sent to decision model training module 136 from data layer 140. Historical parts provisioning and usage records 400 may include ticket identifiers 402, part identifiers 404, and provisioning data 406, as illustrated, for example, in FIG. 4. Ticket identifiers 402, part identifiers 404, and provisioning data 406 may be stored, for example, in tabular form as illustrated, or may be stored in a database in any form usable by provisioning system 100.

Ticket identifiers 402 identify particular tickets Tj, for example, tickets "T234889" and "T389048" in a record 400. Parts identifiers 404 identify particular parts Pi associated with each ticket identifier 402. For example, parts "P9ddu," "Pdi344," "P2ddd" are associated with ticket "T234889" and parts "P1344," "P8d3e", Pdyr8", "P0484" are associated with ticket "T389048." In some embodiments, the list of parts identifiers 404 may include every part Pi that may be associated with the particular piece of hardware that is the subject of a ticket Tj. In some embodiments, the list of parts identifiers 404 may include a subset of the parts Pi that may be associated with the particular piece of hardware that is the subject of a ticket Tj, for example, only those parts actually used or provisioned for that particular ticket Tj.

Historical parts provisioning and usage records 400 may also include provisioning data 406 associated with each part Pi. For example, for each part Pi, provisioning data 406 may include an indication 408 of whether the part Pi was provisioned and used, an indication 410 of whether the part Pi was provisioned and not used, an indication 412 of whether the part Pi was not provisioned but later used, and an indication 414 of whether the part Pi was not provisioned and not used. In some embodiments indications 408, 410, 412, and 414 may have a value of "1" when the indication has been met and a value of "0" when the indication has not been met. For example, provisioning data 406 for ticket "T234889" may include an indication 408 of "1" and indications 410, 412, and 414 of "0" to indicate that part "P9ddu" was both provisioned and used. As another example, provisioning data 406 for ticket "T234889" may include an indication 410 of "1" and indications 408, 412, and 414 of "0" to indicate that part "Pdi344" was provisioned but not used. As another example, provisioning data 406 for ticket "T389048" may include an indication 412 of "1" and indications 408, 410, and 414 of "0" to indicate that part "P1344" was not provisioned but was later used. As another example, provisioning data 406 for ticket "T389048" may include an indication 414 of "1" and indications 408, 410, and 412 of "0" to indicate that part "P8d3e" was not provisioned and not used.

Figure 5:
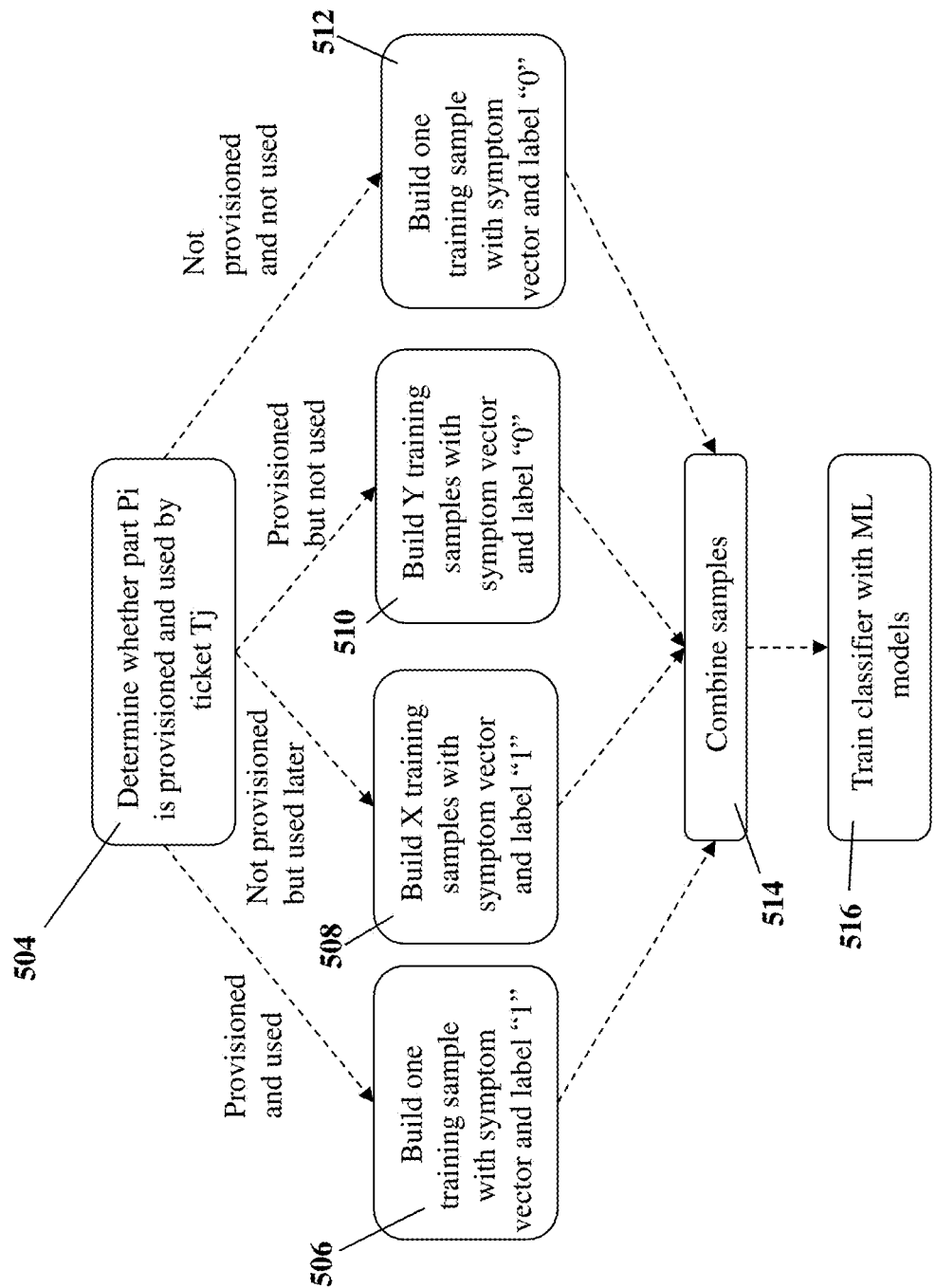
FIG. 5 is a flow chart illustrating a method of training a decision model in accordance with an embodiment of the present disclosure.

At 208, with reference now to FIG. 5, decision model training module 136 trains decision model 122 for each part Pi based on the symptoms vectors 308 output by symptoms vector constructor 134 and the indications 408, 410, 412, and 414 in the corresponding parts provisioning and usage records 400 for the part Pi.

At 502, decision model training module 136 determines whether a part Pi is provisioned and used by a ticket Tj based on the received historical parts provisioning and usage records 400.

If parts provisioning and usage records 400 for a part Pi includes an indication 408 that part Pi was provisioned and used by ticket Tj, for example, part "P9ddu" from FIG. 4 was provisioned and used as shown by indication 408, one training sample including a label "1" indicating that the part was provisioned and including the corresponding symptoms vector 308 for ticket Tj, in this example the symptoms vector 308 for ticket "T234889", is added to decision model 122 at 506.

If parts provisioning and usage records 400 for a part Pi includes an indication 410 that part Pi was not provisioned but was later used by ticket Tj, for example, part "P1344" from FIG. 4 was not provisioned and was later used as shown by indication 410, a predetermined number X of training samples including a label "1" indicating that the part was provisioned and including the corresponding symptoms vector 308 for ticket Tj, in this example a symptoms vector 308 for ticket "T389048", are added to decision model 122 at 508. Predetermined number X may be configurable to adjust or improve the performance of the model. For example, predetermined number X may be configurable to set how much impact an under provisioned part Pi may have on the probability of including the part Pi in future service calls. The value of predetermined number X may be set, for example, based on the relative cost of under provision the particular part Pi, where, for example, the difference in costs between over and under provisioning may warrant training the decision model toward the lower cost option even if that means the part is under or over provisioned. In some embodiments, the value of X may be set, for example, by a user of the system.

If parts provisioning and usage records 400 for a part Pi includes an indication 412 that part Pi was provisioned and not used by ticket Tj, for example, part "Pdi344" from FIG. 4 was provisioned and not used as shown by indication 412, a predetermined number Y of training samples including a label "0" indicating that the part was not provisioned and including the corresponding symptoms vector 308 for ticket Tj, in this example a symptoms vector 308 for ticket "T234889", are added to decision model 122 at 510. Predetermined number Y may be configurable to adjust or improve the performance of the model. For example, predetermined number Y may be configurable to set how much impact an over provisioned part Pi may have on the probability of including the part Pi in future service calls. The value of predetermined number Y may be set, for example, based on the relative cost of under provision the particular part Pi, where, for example, the difference in costs between over and under provisioning may warrant training the decision model toward the lower cost option even if that means the part is under or over provisioned. In some embodiments, the value of Y may be set, for example, by a user of the system.

If parts provisioning and usage records 400 for a part Pi includes an indication 414 that part Pi was not provisioned and not used by ticket Tj, for example, part "P8d3e" from FIG. 4 was not provisioned and not used as shown by 414, one training sample including a label "0" indicating that the part was not provisioned and including the corresponding symptom vector for ticket Tj, in this example a symptom vector for ticket "T389048", is added to decision model 122 at 512.

At 514, the training samples that have been added to decision model 122 are combined together to form a sample set including samples having the label "1" and samples having the label "0".

At 516, the combined training samples are used to train decision model 122 for part Pi. For example, for each sample having a label "1", the probability that the part in question should be provisioned may be increased while for each sample having a label "0", the probability that the part in question should be provisioned may be decreased. This process may be repeated for each historical hardware maintenance ticket Tj and each part Pi until decision model 122 has been trained to predict the a parts usage probability for each part Pi for each piece of hardware based for any set of symptoms that may be included in a hardware maintenance ticket.

Figure 6:
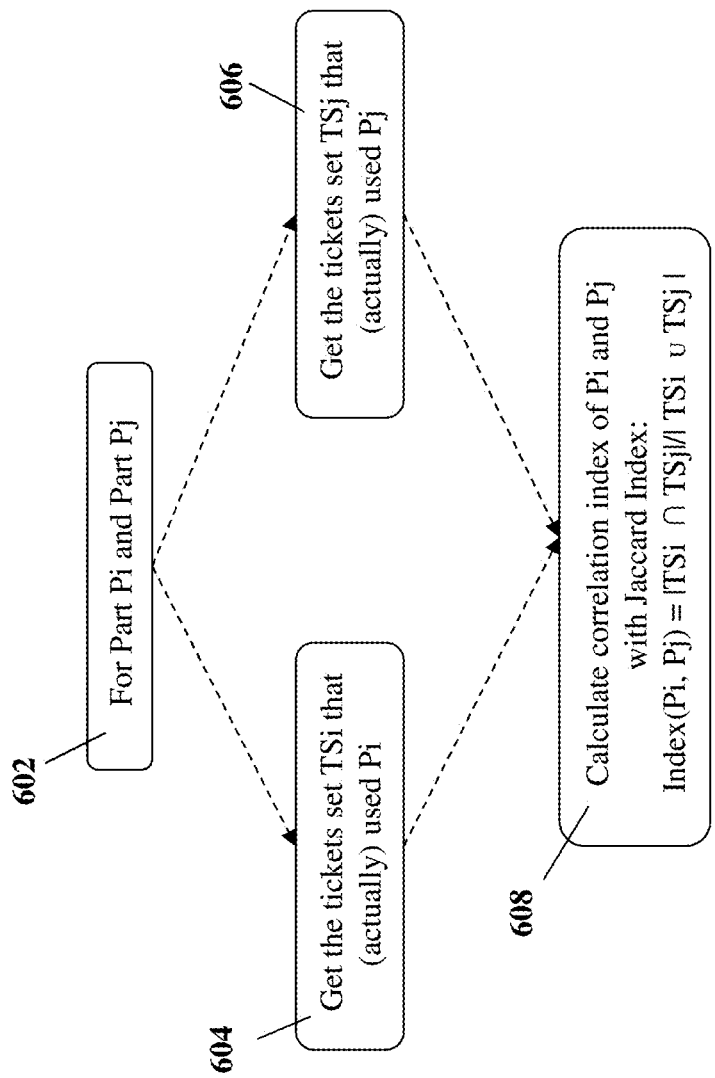
FIG. 6 is a flow chart illustrating a method of calculating a correlation index of parts Pi and Pj in accordance with an embodiment of the present disclosure.

Referring back to FIG. 2, at 210, parts correlation module 124 determines a parts usage correlation index 211 based on the historical tickets 142, log files 144, and parts usage records 146, as further illustrated in FIG. 6. With reference now to FIG. 6, at 602 parts Pi and Pj are used as inputs. At 604 parts correlation module 124 retrieves the tickets TSi that actually used part Pi from data layer 140. At 606 parts correlation module 124 retrieves the tickets TSj that actually used part Pj from data layer 140. A correlation index 211 of parts Pi and Pj is then calculated at 608 using the Jaccard Index:

$$\text{Index}(Pi,Pj)=|TSi \cap TSj|/|TSi \cup TSj|$$

Referring again to FIG. 2, at 212 a new hardware maintenance ticket 214 and corresponding log files 216 are received by ticket data analyzer 130 and mined by ticket transformation module 132 for symptoms 306 in the manner described above with reference to FIG. 3. Symptoms vector constructor 134 then constructs a symptoms vector 220 for new hardware maintenance ticket 214 at 218 in the manner described above for the construction of symptoms vector 308. In some embodiments, an agent 222 may also review the new hardware maintenance ticket 214 for symptoms and may provide symptoms vector constructor 134 with one or more symptoms 224 in addition to the symptoms 306 mined by ticket transformation module 132. This may occur, for example, when the ticket is received in a format or using terminology that is not standard terminology for the system where, for example, some symptoms may not be recognized by ticket transformation module 132 as symptoms 308.

At 226, parts provision module 120 uses the trained decision model 122 to predict a parts usage probability pi of each part Pi for the new hardware maintenance ticket 214. The prediction may be based on a similarity of the symptoms vector of the new hardware maintenance ticket to the symptoms vectors in one or more of the sample sets that have been used to train decision model 122 for each part Pi.

For example, if the new maintenance ticket 214 is ticket "A17ZHR0," ticket similarity calculator 126 may compare symptoms vector 308 for ticket "A17ZHR0" to symptoms vectors 310 that have been constructed from other tickets 312 that have been included in the sample sets used to train decision model 122 to determine a relevance of each sample set to the ticket "A17ZHR0". The degree of relevance, for example, may be determined based on a Euclidean distance between the symptoms vectors. In some embodiments, the degree of relevance may be determined, for example, based on a threshold number of matching symptoms between symptoms vector 308 of ticket "A17ZHR0" and symptoms vectors 310 of sample sets associated with other tickets 312. In some embodiments, a pre-determined threshold of relevance may be applied to determine what training samples are included in the prediction of the parts usage probability for part Pi. For example, the pre-determined threshold may initially be set at medium relevance such that training samples associated with symptoms vectors for tickets having medium relevance may be included when determining the probability that part Pi should be provisioned. In some embodiments the pre-determined threshold may initially be set to low, high or any other relevance. In some embodiments a user or agent 222 may set the threshold of relevance to any value, for example, high, medium, or low relevance, may, for example, set the threshold based on a percentage of the Euclidean distance between the symptoms vectors, or may set the threshold value based on any other value. The following examples may further illustrate the function of ticket similarity calculator 126 when, for example, the relevance threshold is set to medium.

In one example, symptoms vector 308 for ticket "A17ZHR0" may be compared to a symptoms vector 310 of sample sets associated with a ticket "T234889" to determine a relevance of the sample sets associated with a ticket "T234889" to ticket "A17ZHR0". In this example, the symptoms vector for each of tickets "A17ZHR0" and "T234889" includes values of "1" for the symptoms "Powering On" and "Led Activity". The symptoms vector 308 for ticket "A17ZHR0" also includes a value of "1" for the symptom "Fan" while the symptoms vector 310 for ticket "T234889" includes a value of "0" for the symptom "Fan". No other symptoms for either of tickets "A17ZHR0" and "T234889" are indicated to have a value of "1". Accordingly, ticket similarity calculator 126 may determine that tickets "A17ZHR0" and "T234889" are tickets having a high relevance to each other and therefore that the training samples associated with the symptoms vector 310 for ticket "T234889" should be included when determining the probability that the part Pi should be provisioned.

In another example, symptoms vector 308 for ticket "A17ZHR0" may be compared to a symptoms vector 310 of sample sets associated with a ticket "Td8ikmd" to determine a relevance of the sample set associated with ticket "Td8ikmd" to ticket "A17ZHR0". In this example, the symptoms vector for each of tickets "A17ZHR0" and "Td8ikmd" includes values of "1" for the symptoms "Powering On" and "Led Activity". The symptoms vector 308 for ticket "A17ZHR0" also includes a value of "1" for the symptom "Fan" while the symptoms vector 310 for ticket "Td8ikmd" includes a value of "0" for the symptom "Fan". No other symptoms for ticket "A17ZHR0" are indicated to have a value of "1" while at least one other symptom for ticket "Td8ikmd" is indicated to have a value of "1". Accordingly, ticket similarity calculator 126 may determine that tickets "A17ZHR0" and "Td8ikmd" are tickets having a medium relevance to each other and therefore that the training samples associated with the symptoms vector 310 for ticket "Td8ikmd" should be included when determining the probability that part Pi should be provisioned based on the relevance threshold.

In another example, symptoms vector 308 for ticket "A17ZHR0" may be compared to a symptoms vector 310 of sample sets associated with a ticket "T389048" to determine a relevance of ticket "T389048" to ticket "A17ZHR0". In this example, the symptoms vector for each of tickets "A17ZHR0" and "T389048" includes a value of "1" for the symptom "Led Activity". The symptoms vector 308 for ticket "A17ZHR0" also includes values of "1" for the symptoms "Powering On" and "Fan" while the symptoms vector 310 for ticket "T389048" includes a value of "0" for the symptoms "Powering On" and "Fan". No other symptoms for ticket "A17ZHR0" are indicated to have a value of "1" while at least one other symptom for ticket "T389048" is indicated to have a value of "1". Accordingly, ticket similarity calculator 126 may determine that tickets "A17ZHR0" and "T389048" are tickets having a low relevance to each other and therefore that the training samples associated with the symptoms vector 310 for ticket "T389048" should not be included when determining the probability that part Pi should be provisioned.

Figure 7:
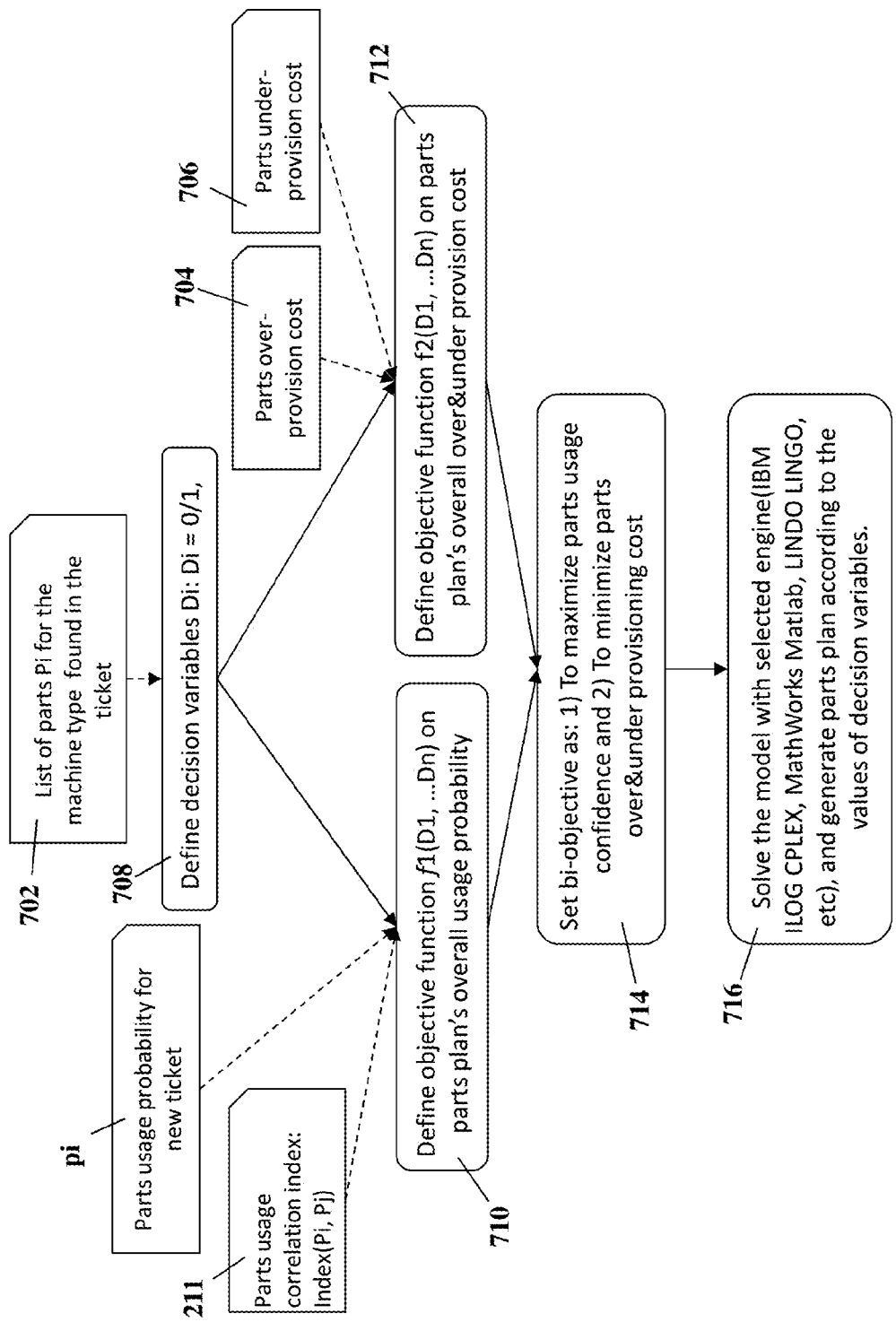
FIG. 7 is a flow chart illustrating a method of generating a parts provisioning plan in accordance with an embodiment of the present disclosure.
Figure 8:
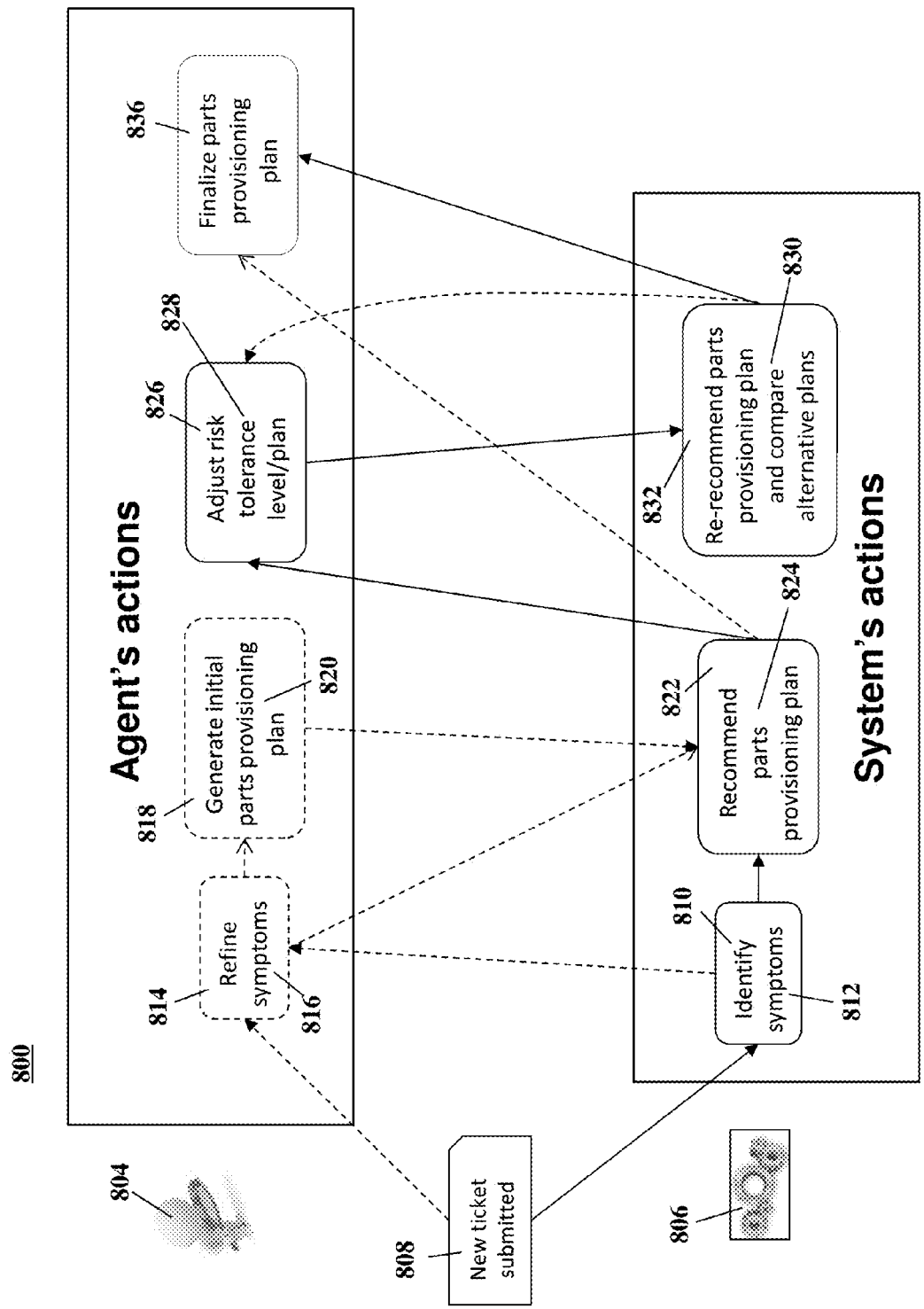
FIG. 8 is a flow chart illustrating interactions between an agent and the provisioning system during a method of generating a parts provisioning plan in accordance with an embodiment of the present disclosure.

At 228, with reference to FIGS. 7 and 8, a parts provisioning plan 230 is generated. Inputs to the parts provisioning plan may include parts usage correlation index 211, the parts usage probability for the new ticket pi generated by decision model 122, a list 702 of the parts Pi for the machine type that is the subject of the ticket, a part-overprovisioning cost 704, and a parts under-provisioning cost 706.

The parts over and under-provisioning costs may be based at least in part on the current parts stocking and shipment information 232 (FIG. 2). In some embodiments, parts provisioning plan 230 may also be based on a risk tolerance level 234 set by an agent 222. In some embodiments, the parts provisioning plan 230 may be optimized or adjusted in response to an adjustment of the risk tolerance level 234 by the agent 222. For example, parts provisioning plan 230 may be initially generated based on an initial pre-determined risk tolerance level and provided to agent 222. If agent 222 desires more or less risk tolerance, agent 222 may adjust the risk tolerance level 234 accordingly and an optimized parts provisioning plan will be provided to the agent 222 for further review and optimization if necessary. The initial or pre-determined risk tolerance level may, for example, be a system setting or configuration setting that may be applied to all new parts provisioning plans. In some embodiments, the over provisioning of parts for a service call may cause additional costs due to, for example, transportation costs, over stocking, or other similar costs. Under provisioning parts for a service call may cause additional costs due to, for example, extra trips to a customer's site for a service engineer, penalties related agreements for minimum ticket fix times, or other similar costs.

With reference again to FIG. 7, at 708, a decision variable Di is defined for each part Pi related to a given hardware machine type. Each decision variable Di represents the decision to include or not include a corresponding part Pi in the parts provisioning plan 230. In some embodiments, decision variables Di may be defined as binary values, for example, "1" and "0" where "1" indicates a decision to include the corresponding part Pi and "0" indicates a decision to not include the corresponding part Pi. Parts provisioning module 120 will solve the model and assign a value of "0" or "1" to each Di for each part Pi that may be included in parts provisioning plan 230.

At 710, an overall usage probability for parts provisioning plan 230 is determined using two kinds of parameters: 1) the probability of each part Pi and 2) the inter-part usage correlation index. The overall usage probability may be defined according to function $f1(D1, \ldots, Dn)$ as follows:

$$f1(D1, \ldots, Dn) = \Sigma pi*Di + E(pi*Di + pj*Dj)*Di*Dj*\text{Index}(Pi, Pj)$$

$\Sigma pi*Di$ is the summarized probability value for all parts included in the plan and $\Sigma(pi*Di+pj*Dj)*Di*Dj*\text{Index}(Pi, Pj)$ adjusts the probability in the event that some parts might be undervalued or overvalued. For example, Pi and Pj having a high probability and/or correlation may provide more adjustment to the overall usage probability as compared to Pi and Pj having low probability and/or a low correlation.

At 712, a parts over provisioning cost for parts provisioning plan 230 is determined using two kinds of parameters: 1) the probability of every part Pi and 2) the overprovision cost of selected parts Pi. The parts over provisioning cost may be defined according to function $f2(D1, \ldots, Dn)$ as follows:

$$f2(D1, \ldots, Dn) = \sum (1-pi)*Di*\text{over\_provision\_cost}(Pi) + \sum pi*(1-Di)*\text{under\_provision\_cost}(Pi)$$

$\Sigma(1-pi)*Di*\text{over\_provision\_cost}(Pi)$ is the expected over provisioning cost for a plan. As pi is the probability that a part Pi should be included in the plan, (1−pi) is the probability that a part Pi might be over provisioned. The over provisioning cost of a part Pi could, for example, be provided by users according to the historical over provisioning cost, current stocking level, shipment situation, or any of the other over provisioning costs mentioned above.

$\Sigma pi*(1-Di)*\text{under\_provision\_cost}(Pi)$ is the expected under provision cost for a plan. $pi*(1-Di)$ is the probability that Pi will be under provisioned. Under provisioning cost of Pi could, for example, be provided by users according to the historical under provisioning cost, for example, penalty, re-transportation cost, or any of the other under provisioning costs mentioned above.

At 714, the bi-objective may be set, for example, an objective to maximize parts usage confidence and an objective to minimize parts over and under provisioning cost. For example, the bi-objective may be set to find the pareto optimal solution to functions $f1$ and $f2$ such that any other solutions better than the solution in $f1$ must be worse than the solution in $f2$ and any other solutions better than the solution in $f2$ must be worse than the solution in $f1$. Other similar methods of balancing the solution functions $f1$ and $f2$ may also be used.

At 716, the model may be solved using a solving engine and the parts provisioning plan 230 may be generated according to the solved values for Di. For example, each part Pi having a solved Di value of "1" will be included in parts provisioning plan 230 while each part Pi having a solved Di value of "0" will not be included in the parts provisioning plan 230. Parts provisioning plan 230 may be stored in data layer 140 as part of the log files 144 or parts usage records 146.

In some embodiments, decision model 122 may be automatically trained as new hardware maintenance tickets 214 are fulfilled. For example, when a new hardware maintenance ticket 214 is received and fulfilled based on the generated parts provisioning plan 230, the fulfilled new hardware maintenance ticket 214 may be stored in data layer 140 with accompanying log files 144 and parts usage records 146 detailing what parts were actually used. Once fulfilled, the new hardware maintenance ticket 214 may be considered a historical hardware maintenance ticket by system 100. System 100 may automatically apply method 200 to the newly stored hardware maintenance ticket 214, log files 144, and parts usage records 146 to further train decision model 122. In some embodiments, the storage of new hardware maintenance ticket 214 with accompanying log files 144 and parts usage records 146 may trigger an update of decision model 122. In some embodiments, data layer 140 may be periodically polled by ticket data analyzer 130 to determine if new fulfilled hardware maintenance tickets and accompanying log files 144 and parts usage records 146 have been received, and if received, may automatically train decision model 122 based on the received new hardware maintenance ticket 214. This process may be automatically performed by provisioning system 100 to ensure that the training of decision model 122 is continuously updated and refined in response to the receipt of fulfilled tickets and accompanying log files 144 and parts usage records 146.

Referring now to FIG. 8, a method 800 of generating a finalized parts provisioning plan 802 including interactions between an agent 804 and system 806 will now be described in accordance with the above embodiments. At 808, a new ticket 810 is submitted. In some embodiments, new ticket 810 may be submitted to both agent 804 and system 806. In some embodiments, new ticket 810 may only be submitted to system 806.

At 810, system 806 identifies symptom 812 in new ticket 808 using ticket transformation module 132 in the manner described above with reference to FIG. 3. In some embodiments, the identified symptoms 812 may be transmitted to agent 804 at 814 along with new ticket 808 for further refinement of the symptoms 812 by agent 804 to generate refined symptoms 816.

In some embodiments, at 818, agent 804 may generate an initial parts provisioning plan 820 based on the refined symptoms 816 and/or the identified symptoms 812. In some embodiments, initial parts provisioning plan 820 may be transmitted to system 806 for use in generating a recommended parts provisioning plan 824.

At 822, system 806 may generate recommended parts provisioning plan 824 in the manner described above with reference to FIG. 2 based on the identified symptoms 812. In some embodiments, system 806 may also use the refined symptoms 816 in addition to the identified symptoms 812 to generate recommended parts provisioning plan 824. In some embodiments, parts provisioning plan 824 may also be generated based at least in part on initial parts provisioning plan 820. For example, where an initial parts provisioning plan 820 includes one or more parts Pi, the Di for each part Pi may be set to 1 by system for inclusion in the recommended parts provisioning plan 824. By setting the Di for each part Pi to 1, the system may include those parts even if they would not normally have been included in the recommended parts provisioning plan 824 based on the output of the decision model. Recommended parts provisioning plan 824 may then be sent to agent 804 for review.

At 826, agent 804 receives recommended parts provisioning plan 824 from system 806 and may adjust a risk tolerance level 828 associated with recommended parts provisioning plan 824. For example, agent 804 may be provided with a user interface 900 presenting the parts provisioning plan for a particular hardware maintenance ticket 902, as shown, for example, in FIG. 9. With reference now to FIG. 9, user interface 900 includes hardware maintenance ticket 902, in this example, the ticket for "A17ZHR0", and a parts provision plan 904 for hardware maintenance ticket 902. Parts provisioning plan 904 includes a listing of parts IDs 906 that are included in the plan, the probability 908 of usage for each listed part as generated by decision model 122, the over-provisioning costs 910 for each listed part, the under-provisioning cost 912 for each part, user activatable elements 914 for removing parts from the plan, a user activatable element 916 for adding a new parts to the plan, an estimated over-provision cost 918 for the entire parts provision plan 904, and an estimated under-provision cost 920 for the entire parts provision plan 904. In some embodiments, user interface 900 may include an adjustment mechanism 922, for example, a slider, a numerical input, or other similar feature, that allows agent to adjust the risk tolerance level 828.

In response to an adjustment of the risk tolerance level 828 by agent 804, system 806 generates an updated recommended parts provisioning plan 830 based on the adjusted risk tolerance level 828 at 832. In some embodiments, the updated recommended parts provisioning plan 830 may be again provided to agent 804 for further review and adjustment of risk tolerance level 828.

At 836, updated recommended parts provisioning plan 830 may be provided to agent 804 as a finalized parts provisioning plan. In some embodiments, recommended parts provisioning plan 824 may be provided to agent 804 at 836 without any modification of recommended parts provisioning plan 842 by agent 804.

Figure 10:
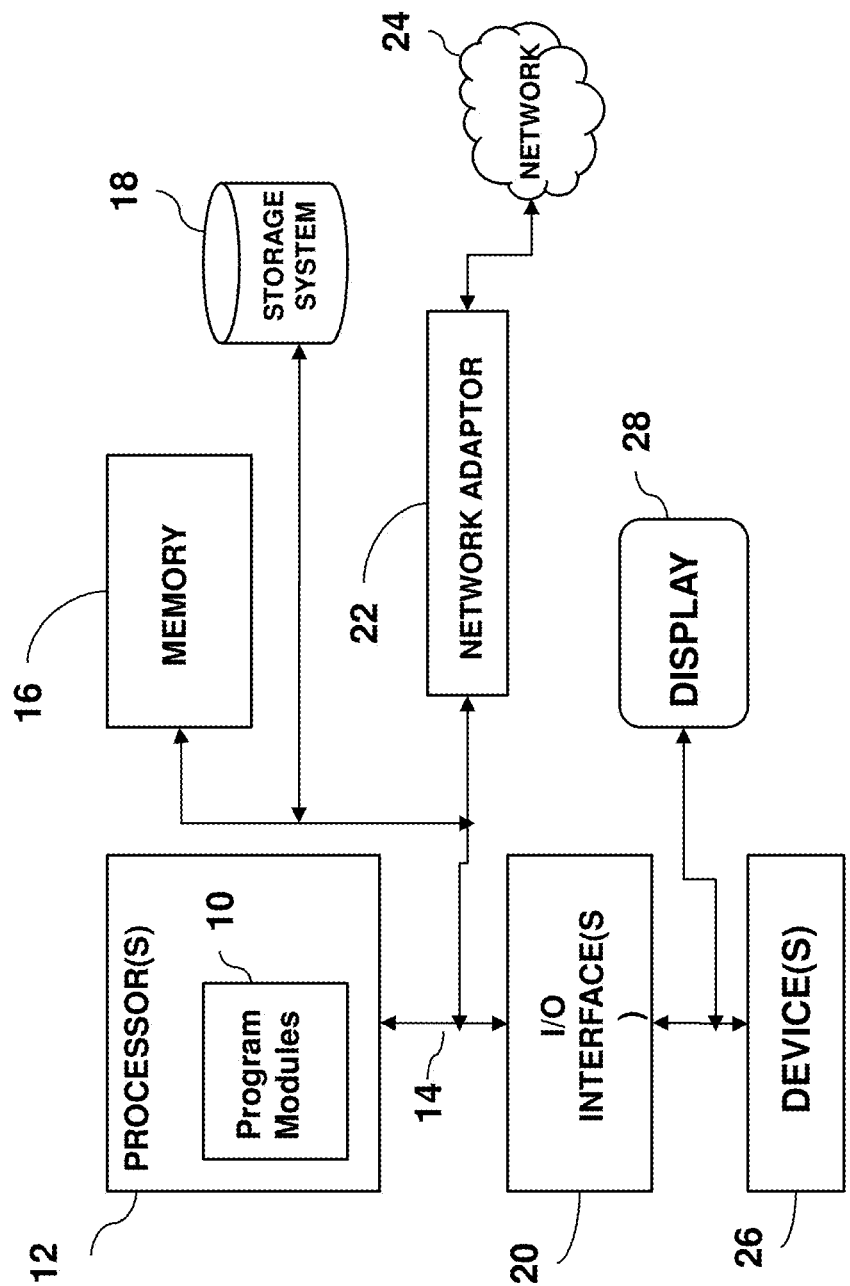
FIG. 10 illustrates a schematic of an example computer or processing system that may implement a provisioning system in accordance with an embodiment of the present disclosure.

FIG. 10 illustrates a schematic of an example computer or processing system that may implement a provisioning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method, comprising:
  receiving, by at least one processor, a historical maintenance ticket associated with a type of hardware device;
  processing, by at least one processor, the historical maintenance ticket to identify one or more symptoms of the historical maintenance ticket;
  constructing, by at least one processor, a symptoms vector for the historical maintenance ticket based at least in part on the identified one or more symptoms of the historical maintenance ticket;
  receiving, by at least one processor, parts usage and provisioning records associated with the type of hardware device;
  determining, by at least one processor, based at least in part on the parts usage and provisioning records, whether a part associated with the type of hardware device was provisioned or not provisioned for the historical maintenance ticket;
  determining, by at least one processor, based at least in part on the parts usage and provisioning records, whether the part was used or not used for the historical maintenance ticket;
  training, by at least one processor, a decision model based at least in part on the symptoms vector for the historical maintenance ticket, the determination of whether the part was provisioned or not provisioned for the historical maintenance ticket, and the determination of whether the part was used or not used for the historical maintenance ticket, the training configuring the decision model to determine a probability that the part will be used by a new maintenance ticket associated with the type of hardware device;
  receiving, by at least one processor, a new maintenance ticket associated with the type of hardware device;
  processing, by at least one processor, the new maintenance ticket to identify one or more symptoms of the new maintenance ticket;
  constructing, by the at least one processor, a symptoms vector for the new maintenance ticket based at least in part on the identified one or more symptoms of the new maintenance ticket;
  executing, by at least one processor, the trained decision model using the symptoms vector of the new maintenance ticket to determine a probability that the part will be used by the new maintenance ticket; and
  generating, by at least one processor, a parts provisioning plan based at least in part on the determined probability that the part will be used by the new maintenance ticket.

2. The method of claim 1, wherein the symptoms vectors for the historical maintenance ticket and the new maintenance ticket comprise a plurality of symptoms associated with the type of hardware device, the symptoms vectors including an indication for each symptom of whether or not each symptom was identified in the respective historical maintenance ticket or new maintenance ticket.

3. The method of claim 1, wherein the decision model is trained based at least in part on symptoms vectors for a plurality of historical maintenance tickets associated with the type of device.

4. The method of claim 1, further comprising:
  automatically, in response to receiving a notification that the new hardware maintenance ticket has been fulfilled:
    receiving parts usage and provisioning records associated with the fulfilled new maintenance ticket;
    determining based at least in part on the parts usage and provisioning records associated with the fulfilled new maintenance ticket, whether the part associated with the type of hardware device was provisioned or not provisioned for the fulfilled new maintenance ticket;
    determining based at least in part on the parts usage and provisioning records associated with the new maintenance ticket, whether the part was used or not used to fulfill new maintenance ticket; and
    further training the decision model based at least in part on the symptoms vector for the new maintenance ticket, the determination of whether the part was provisioned or not provisioned for the fulfilled new maintenance ticket, and the determination of whether the part was used or not used to fulfill the new maintenance ticket.

5. The method of claim 1, further comprising:
  determining a set of historical maintenance tickets that used the part based on the parts usage and provisioning records associated with the type of hardware device,
  determining a second set of historical maintenance tickets that used a second part associated with the type of hardware device based on the parts usage and provisioning records associated with the type of hardware device; and
  generating a parts correlation index between the part and the second part based on the determined first and second sets of historical maintenance tickets,
  wherein the parts provisioning plan is generated at least in part based on the parts correlation index.

6. The method of claim 1, wherein generating the parts provisioning plan comprises:
   solving a first objective function that defines an overall parts usage probability of the parts provisioning plan; and
   solving a second objective function that defines an overall over/under provisioning cost of the parts provisioning plan.

7. The method of claim 1, wherein the parts provisioning plan is generated based at least in part on a risk tolerance level set by an agent via an agent device, the method further comprising:
   receiving an adjustment to the risk tolerance level for the parts provisioning plan from the agent device; and
   updating the parts provisioning plan based at least in part on the received adjustment to the risk tolerance level.

8. A system, comprising:
   at least one processor programmed for:
      receiving a historical maintenance ticket associated with a type of hardware device;
      processing the historical maintenance ticket to identify one or more symptoms of the historical maintenance ticket;
      constructing a symptoms vector for the historical maintenance ticket based at least in part on the identified one or more symptoms of the historical maintenance ticket;
      receiving parts usage and provisioning records associated with the type of hardware device;
      determining based at least in part on the parts usage and provisioning records, whether a part associated with the type of hardware device was provisioned or not provisioned for the historical maintenance ticket;
      determining based at least in part on the parts usage and provisioning records, whether the part was used or not used for the historical maintenance ticket;
      training a decision model based at least in part on the symptoms vector for the historical maintenance ticket, the determination of whether the part was provisioned or not provisioned for the historical maintenance ticket, and the determination of whether the part was used or not used for the historical maintenance ticket, the training configuring the decision model to determine a probability that the part will be used by a new maintenance ticket associated with the type of hardware device;
      receiving a new maintenance ticket associated with the type of hardware device;
      processing the new maintenance ticket to identify one or more symptoms of the new maintenance ticket;
      constructing a symptoms vector for the new maintenance ticket based at least in part on the identified one or more symptoms of the new maintenance ticket;
      executing the trained decision model using the symptoms vector of the new maintenance ticket to determine a probability that the part will be used by the new maintenance ticket; and
      generating a parts provisioning plan based at least in part on the determined probability that the part will be used by the new maintenance ticket.

9. The system of claim 8, wherein the symptoms vectors for the historical maintenance ticket and the new maintenance ticket comprise a plurality of symptoms associated with the type of hardware device, the symptoms vectors including an indication for each symptom of whether or not each symptom was identified in the respective historical maintenance ticket or new maintenance ticket.

10. The system of claim 8, wherein the decision model is trained based at least in part on symptoms vectors for a plurality of historical maintenance tickets associated with the type of device.

11. The system of claim 8, the at least one processor further programmed for:
   automatically, in response to receiving an indication that the new hardware maintenance ticket has been fulfilled:
      receiving parts usage and provisioning records associated with the fulfilled new maintenance ticket;
      determining based at least in part on the parts usage and provisioning records associated with the fulfilled new maintenance ticket, whether the part associated with the type of hardware device was provisioned or not provisioned for the fulfilled new maintenance ticket;
      determining based at least in part on the parts usage and provisioning records associated with the fulfilled new maintenance ticket, whether the part was used or not used to fulfill the new maintenance ticket; and
      further training the decision model based at least in part on the symptoms vector for the new maintenance ticket, the determination of whether the part was provisioned or not provisioned for the fulfilled new maintenance ticket, and the determination of whether the part was used or not used to fulfill the new maintenance ticket.

12. The system of claim 8, the at least one processor further programmed for:
   determining a set of historical maintenance tickets that used the part based on the parts usage and provisioning records associated with the type of hardware device,
   determining a second set of historical maintenance tickets that used a second part associated with the type of hardware device based on the parts usage and provisioning records associated with the type of hardware device; and
   generating a parts correlation index between the part and the second part based on the determined first and second sets of historical maintenance tickets,
   wherein the parts provisioning plan is generated at least in part based on the parts correlation index.

13. The system of claim 8, wherein generating the parts provisioning plan comprises:
   solving a first objective function that defines an overall parts usage probability of the parts provisioning plan; and
   solving a second objective function that defines an overall over/under provisioning cost of the parts provisioning plan.

14. The system of claim 8, wherein the parts provisioning plan is generated based at least in part on a risk tolerance level set by an agent via an agent device, the at least one processor further programmed for:
   receiving an adjustment to the risk tolerance level for the parts provisioning plan from the agent device; and
   updating the parts provisioning plan based at least in part on the received adjustment to the risk tolerance level.

15. A computer program product storing instructions that, when executed by at least one processor, program the at least one processor for:
   receiving a historical maintenance ticket associated with a type of hardware device;

processing the historical maintenance ticket to identify one or more symptoms of the historical maintenance ticket;

constructing a symptoms vector for the historical maintenance ticket based at least in part on the identified one or more symptoms of the historical maintenance ticket;

receiving parts usage and provisioning records associated with the type of hardware device;

determining based at least in part on the parts usage and provisioning records, whether a part associated with the type of hardware device was provisioned or not provisioned for the historical maintenance ticket;

determining based at least in part on the parts usage and provisioning records, whether the part was used or not used for the historical maintenance ticket;

training a decision model based at least in part on the symptoms vector for the historical maintenance ticket, the determination of whether the part was provisioned or not provisioned for the historical maintenance ticket, and the determination of whether the part was used or not used for the historical maintenance ticket, the training configuring the decision model to determine a probability that the part will be used by a new maintenance ticket associated with the type of hardware device;

receiving a new maintenance ticket associated with the type of hardware device;

processing the new maintenance ticket to identify one or more symptoms of the new maintenance ticket;

constructing a symptoms vector for the new maintenance ticket based at least in part on the identified one or more symptoms of the new maintenance ticket;

executing the trained decision model using the symptoms vector of the new maintenance ticket to determine a probability that the part will be used by the new maintenance ticket; and generating a parts provisioning plan based at least in part on the determined probability that the part will be used by the new maintenance ticket.

16. The computer program product of claim 15, wherein the symptoms vectors for the historical maintenance ticket and the new maintenance ticket comprise a plurality of symptoms associated with the type of hardware device, the symptoms vectors including an indication for each symptom of whether or not each symptom was identified in the respective historical maintenance ticket or new maintenance ticket.

17. The computer program product of claim 15, wherein the decision model is trained based at least in part on symptoms vectors for a plurality of historical maintenance tickets associated with the type of device.

18. The computer program product of claim 15, wherein the instructions, when executed by the at least one processor, further program the at least one processor for:

automatically, in response to receiving an indication that the new hardware maintenance ticket has been fulfilled:
  receiving parts usage and provisioning records associated with the fulfilled new maintenance ticket;
  determining based at least in part on the parts usage and provisioning records associated with the fulfilled new maintenance ticket, whether the part associated with the type of hardware device was provisioned or not provisioned for the fulfilled new maintenance ticket;
  determining based at least in part on the parts usage and provisioning records associated with the fulfilled new maintenance ticket, whether the part was used or not used to fulfill the new maintenance ticket; and
  further training the decision model based at least in part on the symptoms vector for the new maintenance ticket, the determination of whether the part was provisioned or not provisioned for the fulfilled new maintenance ticket, and the determination of whether the part was used or not used to fulfill the new maintenance ticket.

19. The computer program product of claim 15, wherein the instructions, when executed by the at least one processor, further program the at least one processor for:

determining a set of historical maintenance tickets that used the part based on the parts usage and provisioning records associated with the type of hardware device, determining a second set of historical maintenance tickets that used a second part associated with the type of hardware device based on the parts usage and provisioning records associated with the type of hardware device; and generating a parts correlation index between the part and the second part based on the determined first and second sets of historical maintenance tickets, wherein the parts provisioning plan is generated at least in part based on the parts correlation index.

20. The computer program product of claim 15, wherein the parts provisioning plan is generated based at least in part on a risk tolerance level set by an agent via an agent device, the instructions, when executed by the at least one processor, further programming the at least one processor for:

receiving an adjustment to the risk tolerance level for the parts provisioning plan from the agent device; and updating the parts provisioning plan based at least in part on the received adjustment to the risk tolerance level.

* * * * *